Dec. 6, 1960        E. G. SWANN        2,963,241

ELECTRICAL GATE PHASE DISCRIMINATOR

Filed Aug. 11, 1953        2 Sheets-Sheet 1

INVENTOR.
EDWIN G. SWANN
BY
ATTORNEYS

Dec. 6, 1960 E. G. SWANN 2,963,241
ELECTRICAL GATE PHASE DISCRIMINATOR
Filed Aug. 11, 1953 2 Sheets-Sheet 2
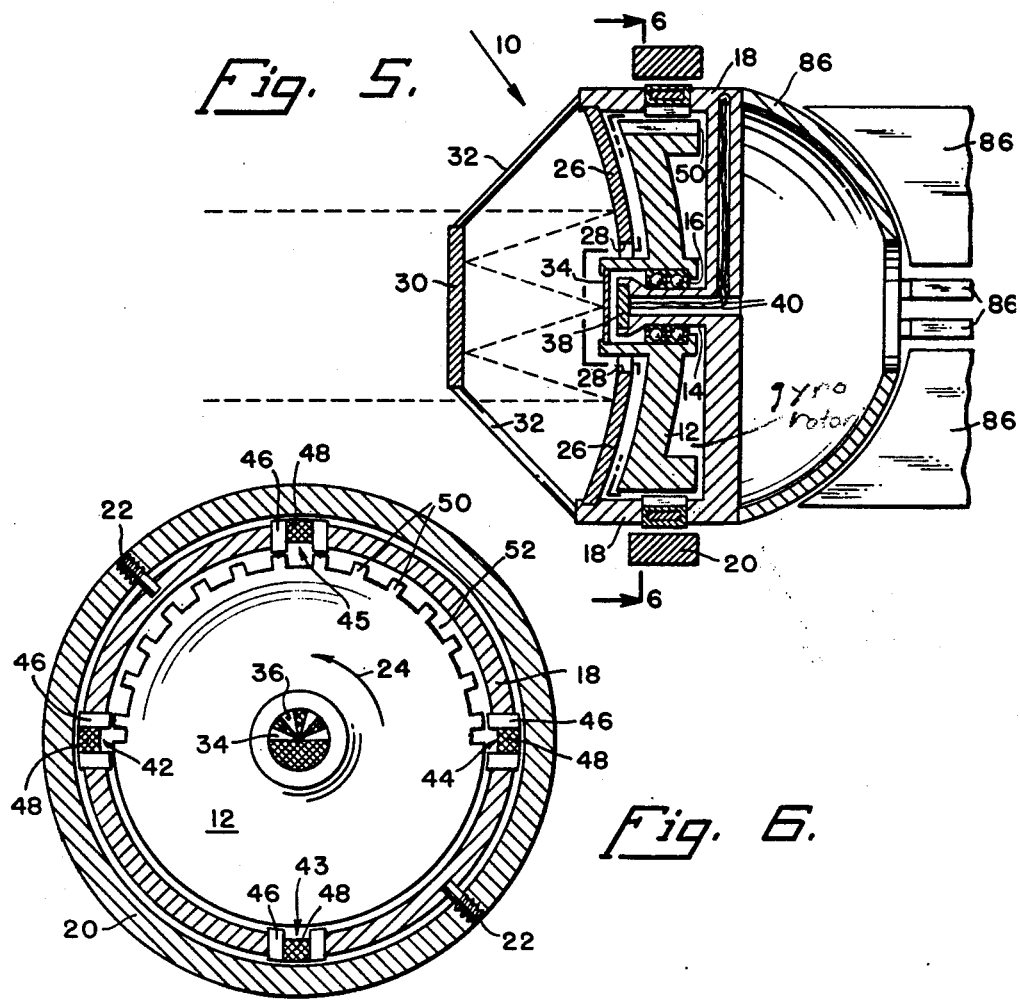
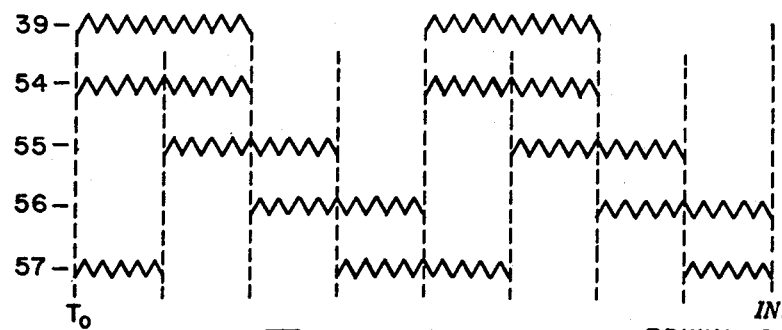
INVENTOR.
EDWIN G. SWANN
ATTORNEYS

United States Patent Office 2,963,241
Patented Dec. 6, 1960

2,963,241

ELECTRICAL GATE PHASE DISCRIMINATOR

Edwin G. Swann, China Lake, Calif., assignor to the United States of America as represented by the Secretary of the Navy Filed Aug. 11, 1953, Ser. No. 373,693

4 Claims. (Cl. 244—14)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in phase discriminators, and in particular to phase discriminators which produce electrical quantities that determine the magnitude and sign of the phase angle of one signal with respect to other signals.

An application to which this invention is particularly well adapted is to produce electrical quantities which uniquely determine the bearing of a source of radiant energy with respect to a fixed reference line. The electrical quantities which determine the bearing of the source of radiant energy can then be used to reorient the fixed reference line so that the source of radiant energy coincides with the reference line; and these quantities may also be used to control a guided missile so that the missile will be guided toward the source of radiant energy.

It is, therefore, an object of this invention to provide a phase discriminator which produces an electrical quantity which is a function of the phase angle of one A.C. signal with respect to another.

It is a further object of this invention to provide a phase discriminator which produces an electrical quantity which is a function of the phase angle of one A.C. signal with respect to two reference A.C. signals which reference signals have a predetermined phase relationship.

It is a still further object of this invention to provide electrical apparatus which produce electrical quantities which determine the magnitude and sign of the phase angle of one A.C. signal with respect to a plurality of A.C. reference signals, each of which reference signals has a predetermined phase relationship with respect to the others.

It is another object of this invention to provide electrical apparatus which produce electrical quantities which uniquely determine the bearing of a source of radiant energy with respect to a fixed reference.

Other objects and many of the attendant advantages of this invention will be readily appreciated as the same become better understood by reference to the following detailed description when considered in connection with the accompanying drawings wherein:

Fig. 4 is a plot against time of the signals generated by the reference signal generators and by the target signal generator;

Fig. 5 is a schematic sectional view of apparatus for generating the reference signals and the target signal, and Fig. 6 is a sectional view taken on line 6—6 of Fig. 5.

Figure 1:
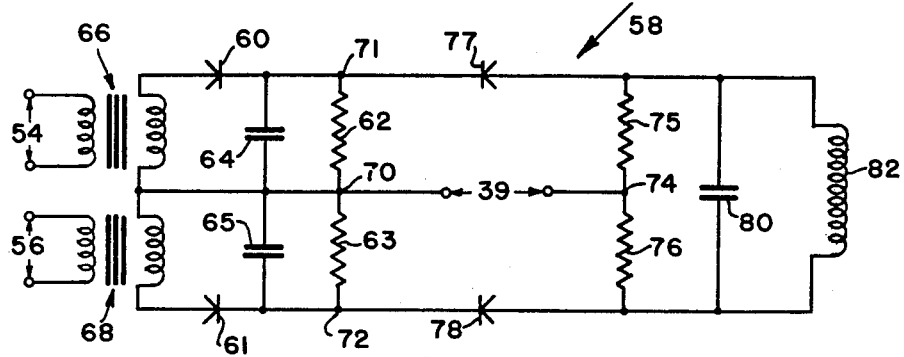
Fig. 1 is a circuit diagram of the improved phase discriminator.

In Figs. 5 and 6 there is illustrated one form which the apparatus for generating reference signals, for generating a target signal, and for determining a fixed reference line, may assume, and which apparatus will subsequently be identified as being seeker 10. Gyroscopic rotor 12 is supported for rotation about axle 14 by antifriction bearing 16. Axle 14 is fixedly mounted on inner gimbal 18 which is mounted within outer gimbal 20 by means of pivots 22. Outer gimbal 20 is adapted to be pivotally mounted in a vehicle, such as a missile, which is not illustrated, by pivots similar to pivots 22. Rotor 12 is adapted to be rotated by an electric motor, which is not illustrated, or by other conventional means in the direction shown by arrow 24. The axis of rotation of rotor 12 determines a reference line.

There is mounted on inner gimbal 18 a modified Cassegrain telescope which consists of a spherical reflector 26 which is provided with a circular opening 28 in the center thereof, and a plane reflector 30 which is secured to inner gimbal 18 by narrow supports 32. The Cassegrain telescope is so oriented on inner gimbal 18 that its optical axis substantially coincides with the axis of rotation of rotor 12. Scanner 34 is located at the focal plane of the telescope and is mounted on rotor 12 so as to be rotated with it. Scanner 34 is a thin round glass slit plate on which is formed a pattern such as is shown in Fig. 6. One half of scanner 34 is covered with an opaque silver film, and the other half of the scanner is covered with a plurality of segments every other one of which is covered with an opaque silver film. The number of segments illustrated in Fig. 6 is much less than the number used in actual practice, but a reduced number of segments has been shown to facilitate illustrating scanner 34.

Electromagnetic radiation from a source of radiant energy, which could, for example, come from a target such as an aircraft, is focused on scanner 34 so long as the target is within the field of view of the Cassegrain telescope. The image 36 of the target is transmitted by the transparent slits in scanner 34 and falls upon photo sensitive detector 38 which is mounted on axle 14. In a preferred embodiment detector 38 is formed of lead sulfide, the resistance of which varies inversely with the intensity of the incident radiation. Since the opaque slits in scanner 34 do not permit target image 36 to fall on detector 38 it follows that as scanner 34 rotates with rotor 12, radiant energy from the target is chopped so that the intensity of the radiation falling on detector 38 varies whenever image 36 is displaced from the center of scanner 34 which in turn coincides with the axis of rotation of rotor 12. The variation in the radiant energy falling on detector 38 varies its resistance and the variations in resistance is used to develop A.C. target signal 39 by conventional means which are not illustrated. Conductors 40 which pass through an opening in axle 14 and bores in gimbals 18, 20 connect detector 38 with the circuit means which convert the variations of the resistance of detector 38 to the A.C. target signal 39.

Four reference signal generators 42, 43, 44, and 45 are equiangularly spaced with respect to the axis of rotation of rotor 12 and are mounted in inner gimbal 18. Each of the reference signal generators 42, 43, 44 and 45 consists of a permanent horseshoe magnet 46 around which is located a coil 48. The outer rim portion of rotor 12 is made of ferromagnetic material having low magnetic retentivity, and a plurality of teeth 50 are formed transversely across the rim for substantially one half the circumference of the rim. The space 52 between adjacent teeth may be filled with a nonmagnetic material such as solder to reduce windage. The distance between adjacent teeth 50 substantially equals the distance between the poles of magnets 46 of each of the generators 42, 43, 44, 45.

When teeth 50 directly underlie the poles of magnet 46 as is the case with generator 45 in Fig. 6, the reluctance of the magnetic circuit of magnet 46 is at a minimum.

When a tooth 50 is between the poles, the reluctance of the magnetic circuit is at a maximum. As rotor 12 rotates, the teeth 50 on rotor 12 pass the magnets 46 of generators 42, 43, 44, 45, and vary the reluctance of the magnetic circuits of the permanent magnets. The variation of the flux in the magnetic circuit of each of the permanent magnets induces an A.C. reference signal in the coil 48 of each generator. No reference signals are induced in generators 42, 43, 44 and 45 when that portion of the rim of rotor 12 in which no teeth are formed moves past a reference generator.

In Fig. 4 the reference signals, 54, 55, 56, and 57 of generators 42, 43, 44, 45, respectively, are plotted against time, with $t_0$ corresponding to a time when rotor 12 is substantially in the position shown in Fig. 6. Since teeth 50 are formed around one half the circumference of rotor 12, A.C. reference signals 54, 55, 56 and 57 are square wave modulated signals, and because of the location of generators 42, 43, 44 and 45 about rotor 12, it is obvious that the frequencies of the modulating signals of reference signals 54, 55, 56 and 57 are equal and out of phase with respect to each other by predetermined phase angles. For example, the modulating signals of reference signals 54 and 56 are 180° out of phase with each other as are the modulating signals of reference signals 55 and 57; and the modulating signals of reference signals 54 and 55 are 90° out of phase with respect to each other.

In Fig. 1 discriminator 58 has a first demodulating loop consisting of a current rectifier 60, resistor 62, and condenser 64, and a second demodulating loop consisting of current rectifier 61, resistor 63 and condenser 65. The resistance of resistors 62, 63 and the capacitance of condensers 64, 65 are substantially equal. Reference signal 54 of generator 42 is applied to the first demodulating loop by means of transformer 66 while reference signal 56 is applied to the second demodulating loop by means of transformer 68. The two demodulating loops are interconnected so that terminal 70 which is between resistors 62, 63 is common to the two loops. The constants of the two demodulating loops are so chosen that the values of the pulsating D.C. voltages that are developed across resistors 62, 63 substantially equal the peak voltages of the A.C. signals applied. Because of the manner in which rectifying means 60, 61 are connected, the potential of terminal 70 will be equal to or less than the potentials of terminals 71, 72. Target signal 39 is applied between terminal 70 and terminal 74 which is between equal resistors 75, 76. Terminal 74 is connected to terminal 70 by a circuit which includes resistors 75, current rectifier 77 and resistor 62; and by a second circuit which includes resistor 76, current rectifier 78, and resistor 63. Filter condenser 80 and load coil 82 are each connected so as to be in parallel with series connected resistors 75, 76.

The voltages of reference signals 54, 55, 56 and 57 which are produced by generators 42, 43, 44 and 45 are substantially of equal amplitude so that the pulsating D.C. voltages developed across resistors 62, 63, are also equal. The magnitude of the voltage of the target signal 39 is made less than the voltages of the reference signals. Since reference signals 54 and 56 are produced by generators 42, 44 which are located on opposite sides of rotor 12, there will be no D.C. potential across resistor 63 when a D.C. potential exists across resistor 62 and vice versa.

Since the radiation from a target is chopped by scanner 34 during one half of the period of rotation of rotor 12, target signal 39 will also be a square wave modulated A.C. signal, the frequency of whose modulating signal equals that of the modulating signals of the reference signals 54, 55, 56 and 57. The phase angle of the modulating signal of target signal 39 with respect to the reference signals 54, 55, 56 and 57 may be of any value and is determined by the bearing of image 36 relative to the axis of rotation of rotor 12.

Figure 2:
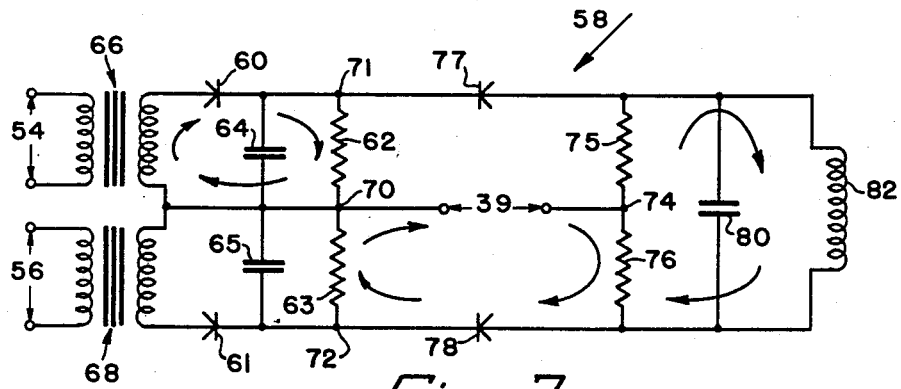
Figs. 2 and 3 are views of the phase discriminator which illustrate the operation thereof.

If target signal 39 is being generated at the same time that reference signal 54 is being generated, current will flow in the demodulating loop which includes resistor 62 in the direction shown by the arrow in Fig. 2 so that terminal 71 is positive with respect to terminal 70. The voltage developed across resistor 62 substantially equals the peak voltage of reference signal 54 and is greater than the peak voltage of target signal 39. Therefore, terminal 71 is positive with respect to terminal 74, and no current will flow through current rectifier 77. At the same time the potential between terminal 74 and terminal 72 is equal to the sum of target signal 39 and the voltage across resistor 63 with the result that terminal 72 can be at a lower potential than terminal 74 since no D.C. potential exists across resistor 63. Pulsating D.C. current can thus flow through current rectifier 78 as indicated by the arrows and through load coil 82.

Figure 3:
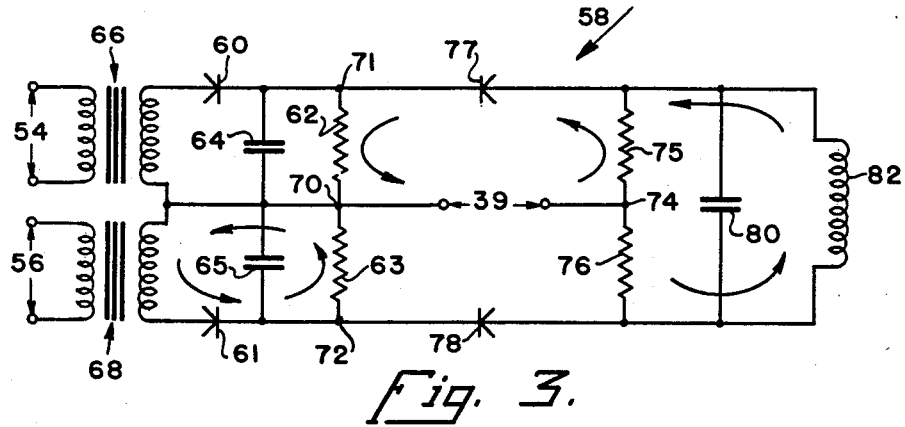

The arrows in Fig. 3 show the direction of current flow in discriminator 58 when the target signal 39 is being generated at the same time as reference signal 56. From the foregoing it can be seen that the net current flow through coil 82 in a period equal to the time for rotor 12 to complete a revolution is a function of the phase angle of the modulating signal of target signal 39 with respect to the modulating signals of reference signals 54 and 56. Likewise the net current flow through resistors 75, 76 is also a function of this phase angle.

The net current flow through coil 82, while it is a function of the phase angle, does not uniquely determine the phase angle since there are, in general, two phase angles which will produce the same net current flow through coil 82. The use of a second circuit substantially identical with the circuit of Fig. 1 in which reference signals 55 and 57 are applied to the discriminator, together with target signal 39, will produce a second net current flow through the load coil of the second discriminator. The net current flow through the load coils of the two discriminators together uniquely determine the magnitude and sign of the phase angle of the modulating signal of reference signal 39 with respect to the modulating signals of the reference signals.

The physical arrangement of the target signal generator and the reference signal generators makes the phase angle of the modulating frequency of target signal 39 with respect to the modulating frequencies of the reference signals 54, 55, 56, 57 analogous to the bearing of the target image with respect to the axis of rotation of gyroscope rotor 12. In Fig. 6 a straight line through the reference generators 42, 44 and the axis of rotation of rotor 12 determines a coordinate axis while a second straight line through reference generators 43, 45 and the axis of rotation of rotor 12 determines a second coordinate axis at right angles to the first. The two coordinate axes and the axis of rotation establish a rectangular set of coordinates. The axis on which generators 42, 44 lie can be taken as the horizontal axis, while the axis on which generators 43, 45 lie can be taken as the vertical axis. The discriminator of Fig. 1 by combining reference signals 54, 56 with target signal 39 produces a net current flow through coil 82 which is proportional to the amount target image 36 is to the right or left of the vertical axis. A second discriminator like that illustrated in Fig. 1 by combining reference signals 55 and 57 with target signal 39 produces a net current flow through its load coil which is proportional to the amount the target image 36 is above or below the horizontal axis. The currents flowing through the load coils uniquely determine the bearing of the target image 36 with respect to the intersection of the axis of rotation of rotor 12 and the plane determined by the coordinate axis through generators 42, 43, 44 and 45.

The current flowing through the load coils of the two discriminator circuits can be amplified by conventional magnetic amplifiers, for example, to suitable values and the amplified currents can be used to precess gyroscopic rotor 12 so that the target image 36 will coincide with the axis of rotation of rotor 12. The amplified currents can also be used to regulate the steering means of a missile to guide the missile toward the source of radiation.

Hemispherical dome 84 which is mounted on inner gimbal 18 and electromagnetic means 86, or any other conventional precessing means, can be used to precess rotor 12 responsive to the current flowing through the load coils of the two discriminators. Conventional amplifying means may be used to amplify target signal 39 the correct amount.

In Fig. 4 target signal 39 is shown as being in phase with reference signal 54 which corresponds to a location of image 36 on the horizontal axis through generators 42 and 44 and to the left of the vertical axis through generators 43, 45. Current will flow through load coil 82 of discriminator 58 in the direction shown by the arrows of Fig. 2 for one-half of the period of rotation of rotor 12 and the bearing of the target image with respect to the axis of rotation is determined by the net current flow in coil 82. This is not the general case and is true only when the target image lies on one of the coordinate axes. In the second discriminator to which reference signals 55, 57 and target signal 39 are combined, there would be no net current flow through the load coil since the target image coincides for one fourth of the period of rotation of rotor 12 with reference signal 55 and for another one-fourth of a period of rotation with reference signal 57 with the result that the net current flow through the load coil is zero.

Whenever target image 36 is not on one of the coordinate axes and displaced from the axis of rotation of rotor 12, current will flow through the load coils of each of the discriminators in both directions. The net flow of current of one of the load coils will, however, be proportional to the amount the target is above or below the horizontal axis and the net flow in the other load coil will be proportional to the amount the target is to the right or left of the vertical axis. When the axis of rotation of rotor 12 points directly at the target, no target signal 39 will be generated and no current will flow through the load coils of the discriminators.

Obviously many modifications and variations of the present invention are possible in the light of the above teachings. It is therefore to be understood that within the scope of the appended claims the invention may be practiced otherwise than as specifically described.

What is claimed is:

1. In combination a first pair of reference voltage generators adapted to produce first and second square wave modulated A.C. reference signals, the modulating signals of said first and second reference signals being of equal frequency and 180° out of phase, a second pair of reference voltage generators adapted to produce a third and fourth square wave modulated A.C. reference signals, the modulating signals of said third and fourth reference signals being of equal frequency and 180° out of phase, the modulating frequencies of said reference signals being equal and the modulating frequencies of said third and fourth reference signals being 90° out of phase with respect to the modulating frequency of said first reference signal, a target signal generator adapted to produce a square wave modulated A.C. target signal, the frequency of its modulating signal equaling the modulating frequencies of said reference signals, a first phase discriminator network adapted to combine the first and second reference signals with said target signal to produce an electrical quantity, a second phase discriminator network adapted to combine said third and fourth reference signals with said target signal to produce a second electrical quantity, said electrical quantities determining the sign and magnitude of the phase angle of the modulating signal of the target signal with respect to each of the modulating signals of said first, second, third and fourth reference signals.

2. The combination of claim 1 in which the first phase discriminator comprises first and second demodulating loops to which are applied, respectively, the first and second reference signals, each of the demodulating loops of the first discriminator being adapted to produce a pulsating D.C. potential, and circuit means to which is applied the target signal, said circuit means being adapted to add the target signal in series with each of the pulsating D.C. potentials produced by the demodulating loops of the first discriminator, said circuit means including rectifying means adapted to permit current to flow in said circuit when the sum of said target signal with each pulsating D.C. potential is less than zero, and in which the second phase discriminator comprises first and second demodulating loops to which are applied, respectively, the third and fourth reference signals, each of the demodulating loops of the second discriminator being adapted to produce a pulsating D.C. potential, and circuit means to which is applied the target signal, said circuit means being adapted to add the target signal in series with each of the pulsating D.C. potentials produced by the demodulating loops of the second discriminator, said circuit means of said second discriminator including rectifying means adapted to permit current to flow in the circuit means when the sum of said target signal with each pulsating D.C. potential is less than zero.

3. In combination a first pair of reference voltage generators adapted to produce first and second square wave modulated A.C. reference signals, the modulating signals of said first pair of reference generators being of equal frequency and 180° out of phase, a second pair of reference voltage generators adapted to produce third and fourth square wave modulated A.C. reference signals, the modulating signals of said second pair of reference generators being of equal frequency and 180° out of phase, the modulating frequencies of said reference signals being equal, and the modulating frequencies of said third and fourth reference signals being 90° out of phase with respect to the modulating frequency of said first reference signal, the amplitudes of said reference signals being substantially equal, a target signal generator adapted to produce a square wave modulated A.C. target signal, the amplitude of the target signal being less than the amplitudes of said reference signals, and the frequency of its modulating signal equaling the modulating frequencies of said reference signals, a first phase discriminator network adapted to combine the first and second reference signals with said target signal to produce an electrical quantity, a second phase discriminator network adapted to combine said third and fourth reference signals with said target signal to produce a second electrical quantity, said electrical quantities determining the sign and magnitude of the phase angle of the modulating signal of the target signal with respect to each of the modulating signals of said reference signals.

4. The combination of claim 3 in which the first discriminator comprises first and second demodulating loops, each of said loops including a resistor having substantially the same resistance, said loops having applied to them, respectively, the first and second reference signals and adapted to develop across said resistors pulsating D.C. potentials, and circuit means to which is applied the target signal, said circuit means being adapted to add the target signal in series with each of said pulsating D.C. potentials and including rectifying means adapted to permit current to flow in said circuit when the sum of the target signal with each pulsating D.C. potential is less than zero; and in which the second discriminator comprises first and second demodulating loops, each of said loops including a resistor having substantially the same resistance, said loops having applied to them, respectively, the third and fourth reference signals, and adapted to develop across said resistors pulsating D.C. potentials, and circuit means to which is applied the target signal, said circuit means being adapted to add the target signal in series with each of said pulsating D.C. potentials and including rectifying means adapted to permit current to flow in said circuit when the sum of the target signal with each of the pulsating D.C. potentials is less than zero.

References Cited in the file of this patent

UNITED STATES PATENTS

| 2,225,348 | Mikelson | Dec. 17, 1940 |
| 2,443,195 | Pensyl | June 15, 1948 |
| 2,568,250 | O'Brien | Sept. 18, 1951 |
| 2,683,803 | Keizer | July 13, 1954 |
| 2,703,380 | Fraser | Mar. 1, 1955 |

FOREIGN PATENTS

| 592,835 | Great Britain | Sept. 30, 1947 |